(12) United States Patent  
Diaz (10) Patent No.: US 11,299,232 B2  
(45) Date of Patent: Apr. 12, 2022

(54) SUSPENSION SYSTEM WITH A TUNABLE AIR SPRING

(71) Applicant: Anthony Diaz, Durango, CO (US)

(72) Inventor: Anthony Diaz, Durango, CO (US)

(*) Notice: Subject to any disclaimer, the term of this patent is extended or adjusted under 35 U.S.C. 154(b) by 2001 days.

(21) Appl. No.: 14/769,445

(22) PCT Filed: Feb. 20, 2014

(86) PCT No.: PCT/US2014/017512  
§ 371 (c)(1),  
(2) Date: Aug. 20, 2015

(87) PCT Pub. No.: WO2014/130739  
PCT Pub. Date: Aug. 28, 2014

(65) Prior Publication Data  
US 2016/0001847 A1 Jan. 7, 2016

Related U.S. Application Data

(60) Provisional application No. 61/766,788, filed on Feb. 20, 2013.

(51) Int. Cl.  
*B62K 17/00* (2006.01)  
*B62K 25/08* (2006.01)  
*F16F 9/06* (2006.01)  
*B60G 11/27* (2006.01)  
*B60G 15/12* (2006.01)  
*B60G 17/052* (2006.01)  
*B62K 25/04* (2006.01)

(52) U.S. Cl.  
CPC .............. *B62K 25/08* (2013.01); *B60G 11/27* (2013.01); *B60G 15/12* (2013.01); *B60G 17/052* (2013.01); *F16F 9/065* (2013.01); *B62K 2025/045* (2013.01); *B62K 2201/08* (2013.01)

(58) Field of Classification Search  
CPC .............. B62K 25/08; B62K 2025/045; B62K 2201/08; B60G 11/27; B60G 15/12; B60G 17/052; F16F 9/065  
See application file for complete search history.

(56) References Cited

U.S. PATENT DOCUMENTS

| | | | | |
|---|---|---|---|---|
| 5,127,634 A * | 7/1992 | Le Gourvellec | ........ | F16F 9/096 188/289 |
| 7,870,936 B2 * | 1/2011 | Shipman | ................... | F16F 9/56 188/299.1 |
| 8,196,947 B2 * | 6/2012 | Achenbach | ............. | F16F 9/461 280/276 |

(Continued)

*Primary Examiner* — Toan C To  
(74) *Attorney, Agent, or Firm* — Bradley Fox (57) ABSTRACT

This invention relates to vehicle suspension systems and devices, and particularly to vehicle suspension systems and devices having an air spring with adjustable and/or tunable characteristics. The vehicle suspension may generally include features for modifying the spring rate of an air spring, such as, for example, to increase initial suppleness and to decrease spiking during later portions of travel. In an exemplary aspect, the fork may include features for decreasing the initial volume of the air chamber of the positive air spring during the initial part of travel and may further include features for expanding the air chamber of positive air spring during a later part of travel.

20 Claims, 4 Drawing Sheets

(56) References Cited

U.S. PATENT DOCUMENTS

| | | | |
|---|---|---|---|
| 8,251,376 B2* | 8/2012 | Mouri | B62K 25/08 |
| | | | 280/5.515 |
| 10,731,724 B2* | 8/2020 | Laird | F16F 9/18 |
| 2006/0065496 A1* | 3/2006 | Fox | B62K 25/286 |
| | | | 188/275 |
| 2008/0041681 A1* | 2/2008 | Shipman | F16F 9/56 |
| | | | 188/319.2 |
| 2010/0066051 A1* | 3/2010 | Haugen | F03G 1/00 |
| | | | 280/124.157 |
| 2010/0225081 A1* | 9/2010 | Galasso | F16F 9/185 |
| | | | 280/124.1 |
| 2011/0083930 A1* | 4/2011 | Laird | F16F 9/092 |
| | | | 188/275 |
| 2011/0215551 A1* | 9/2011 | Galasso | F16F 9/02 |
| | | | 280/276 |
| 2016/0001846 A1* | 1/2016 | Pye | B60G 15/12 |
| | | | 280/276 |

* cited by examiner

SUSPENSION SYSTEM WITH A TUNABLE AIR SPRING

CROSS-REFERENCE TO RELATED APPLICATIONS

This application is a 371 national stage application of PCT International Application Ser. No. PCT/US14/17512, filed Feb. 20, 2014, entitled "SUSPENSION SYSTEM WITH A TUNABLE AIR SPRING", which claims the benefit and priority of U.S. provisional patent application Ser. No. 61/766,788, filed Feb. 20, 2013, entitled "SUSPENSION SYSTEM WITH A TUNABLE AIR SPRING", the contents of such applications are hereby incorporated by reference in their entireties.

FIELD OF THE INVENTION

This invention relates to vehicle suspension systems and devices, and particularly to vehicle suspension systems and devices having an air spring with adjustable and/or tunable characteristics.

BACKGROUND OF THE INVENTION

Air springs are widely utilized in vehicle suspension, including extensively in bicycles and motorcycles. Standard air springs can have less desirable characteristics than coil springs, such as lacking in initial suppleness and smooth bottom out resistance without spiking. The air chamber of an air spring is pressurized and at the start of compression, the load is pushing against the fully pressurized air spring. This is in comparison to a coil spring, where there is very little initial resistance unless the spring has been significantly preloaded.

The bicycle industry has tried to increase the initial suppleness of air spring suspension by adding a negative spring, which can be either an air or coil spring. The negative spring, such as, for example, in a fork, puts pressure on the main positive air piston from the opposite side, which can theoretically cancel out the positive air pressure during the initial compression and travel of the fork. At rest, a fork with equal pressure in the positive and negative chamber should theoretically feel like a coil and need very little loading pressure to initiate fork travel. As the fork starts to compress, the negative chamber, which is typically very small in volume compared to the positive chamber, begins to expand, 1 pressure and effectiveness on the main piston. When a coil spring is used as a negative spring, the coil begins to extend and relax as the pressure in the positive chamber increases.

The problem with negative air springs and coil springs is that when running higher air pressure, they loose their effectiveness and the fork feels stiff initially unlike even firm coil springs. To help alleviate this problem, spacers or oil can be added to the positive chamber to lower the total volume and make the spring rate more progressive. With a more progressive spring rate, lower initial air pressure can be used and the suspension can still have the bottom out resistance similar to running a higher pressure. However, when lessening the volume, there can be spiking in the spring rate.

SUMMARY OF THE INVENTION

This invention relates to vehicle suspension systems and devices, and particularly to vehicle suspension systems and devices having an air spring with adjustable and/or tunable characteristics.

In one aspect of the invention, a vehicle suspension device may generally include a fork having at least a central steering tube, coupled to a crown which branches into two fork legs. In general, the two fork legs may be compressible in length with a given amount of travel and each fork leg may generally have a lower tubular portion with an upper tubular stanchion disposed at least partially therein. The stanchion may generally have a stop or limiter such that it does not completely exit the lower tubular portion during operation. In some embodiments, at least one fork leg may generally house a pressurized air chamber with a piston disposed therein, where the piston is able to translate within the air chamber with a fixed end attached to the lower tubular portion. In some embodiments, the pressurized air chamber may generally occupy the space between the top of the stanchion, which may attach to the crown, and the head of the piston. When subjected to a vertical load, the piston may generally push on the gas in the air chamber and cause it to compress, initiating travel of the stanchion into the lower tubular portion. The air chamber and piston may thus be utilized as a positive air spring. In exemplary embodiments, there may also be a second air chamber which may generally occupy the space between the piston head and the bottom of the stanchion. The second air chamber may generally operate as a negative air spring by applying pressure to the opposite side of the piston head as the positive air spring. The positive and negative air springs may be independently pressurized with gas, or they may be fully linked, partially linked, or selectively linked to allow gas to flow between them. In alternative embodiments, the negative air spring may also be replaced with a coil spring and/or any other appropriate spring. In some embodiments, an inverted fork design may also be utilized with fork legs formed from tubular uppers and lower tubular stanchions. In other embodiments, a one-leg fork design may also be utilized, such as the Lefty®-type forks (Cannondale Bicycle, Bethel, Conn., U.S.A.), In an exemplary aspect, the fork may include features for decreasing the initial volume of the air chamber of the positive air spring during the initial part of travel and may further include features for expanding the air chamber of positive air spring during a later part of travel. This decreasing of initial volume may be desirable, for example, as the smaller initial volume of the positive air spring may generally cause the spring rate to be more progressive than a larger volume air spring and may thus enable the user to operate the positive air spring with lower pressure to increase initial suppleness. The expanding of the positive air spring later in the travel may be desirable, for example, to reduce spiking, such as towards the bottom of the fork travel.

In an exemplary embodiment, the fork includes an adjustable air chamber in addition to the positive and negative air springs. The adjustable air chamber may generally occupy a space at the top of the stanchion (at the crown) and above the positive air spring. The adjustable air chamber may generally include a tubular portion with one end connected to a valve to pressurize the chamber, and the other end being open to the positive air spring below. The adjustable air chamber further includes a floating piston within the tubular portion which may generally translate vertically within the tubular portion between the two ends. The tubular portion may generally include a retaining stop for retaining the floating piston within the tubular portion and thus preventing the floating piston from translating out through the lower end of the tubular portion into, for example, the positive air spring. The adjustable air chamber may thus be utilized by pressurizing the space between the valve end and the floating piston with gas such that the floating piston translates downward to restrict the volume of the positive air spring. During use, load on the fork may then load both the positive air spring and the adjustable air chamber, with the adjustable air chamber decreasing in volume during at least part of the travel due to the increased pressure in the positive air spring pushing on the floating piston.

In some embodiments, the adjustable air chamber may also include at least one spacer between the floating piston and the retaining stop of the tubular portion, such that the maximum volume of the adjustable air chamber between the floating piston and the valve end may be adjusted. This may generally be desirable to tune the characteristics of the adjustable air chamber and its interaction with the positive air spring.

In some exemplary embodiments, the adjustable air chamber may be included into a separate unit which may, for example, be inserted into an existing fork leg as a retrofit. This may be desirable as there are many existing fork designs which can vary greatly in performance and characteristics, and many users may desire to retain most, if not all, of those while also utilizing the characteristics and performance enhancements of the adjustable air chamber unit. For example, an adjustable air chamber unit may be utilized which may thread into the top of a fork stanchion similarly to the air valve cap of many existing forks. In some embodiments, the adjustable air chamber unit may also include multiple valves to, for example, allow separate pressurization of the positive air spring, the negative air spring and/or the adjustable air chamber. The adjustable air chamber unit may further be utilized, for example, with a c-clip and/or other appropriate retention feature inside the stanchion to hold the unit in place.

In another aspect of the invention, a rear shock absorber may also include features for decreasing the initial volume of the air chamber of the positive air spring during the initial part of travel and may further include features for expanding the air chamber of positive air spring during a later part of travel, similarly to the fork, as above. In an exemplary embodiment, a rear shock may include an adjustable air chamber similar to the fork, as above. In other exemplary embodiments, the rear shock may include an adjustable air chamber which may, for example, sit outside of the positive air spring, such as in an extension part or piggyback portion. The adjustable air chamber may operate generally similarly to the adjustable air chamber in the fork, as above, and may generally include a floating piston, with one end of the chamber on one side of the floating piston being in fluid communication with the positive air spring, such that pressure in the opposing end of the adjustable air chamber may load one side of the floating piston and the positive air spring may load the other side of the floating piston. A retaining feature may also be included to limit translation of the floating piston. In some embodiments, the adjustable air chamber may also include at least one spacer, similarly to the adjustable air chamber of the fork above.

In an alternative aspect of the invention, other forms of springs may be utilized in place of an adjustable air chamber for decreasing the initial volume of the air chamber of the positive air spring during the initial part of travel and for expanding the air chamber of positive air spring during a later part of travel. In some alternative embodiments, a coil spring, elastomeric spring, and/or any other appropriate form of spring may be utilized in place of the gas in the adjustable air chamber. In some embodiments, the alternative spring may also be adjustable such as, for example, by preloading for altering the initial spring characteristics.

The present invention together with the above and other advantages may best be understood from the following detailed description of the embodiments of the invention as illustrated in the drawings.

DETAILED DESCRIPTION OF THE INVENTION

The detailed description set forth below is intended as a description of the presently exemplified devices, methods and materials provided in accordance with aspects of the present invention, and is not intended to represent the only forms in which the present invention may be practiced or utilized. It is to be understood, however, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the exemplified methods, devices and materials are now described.

This invention relates to vehicle suspension systems and devices, and particularly to vehicle suspension systems and devices having an air spring with adjustable and/or tunable characteristics. The vehicle suspension may generally include features for modifying the spring rate of an air spring, such as, for example, to increase initial suppleness and to decrease spiking during later portions of travel.

Figure 1:
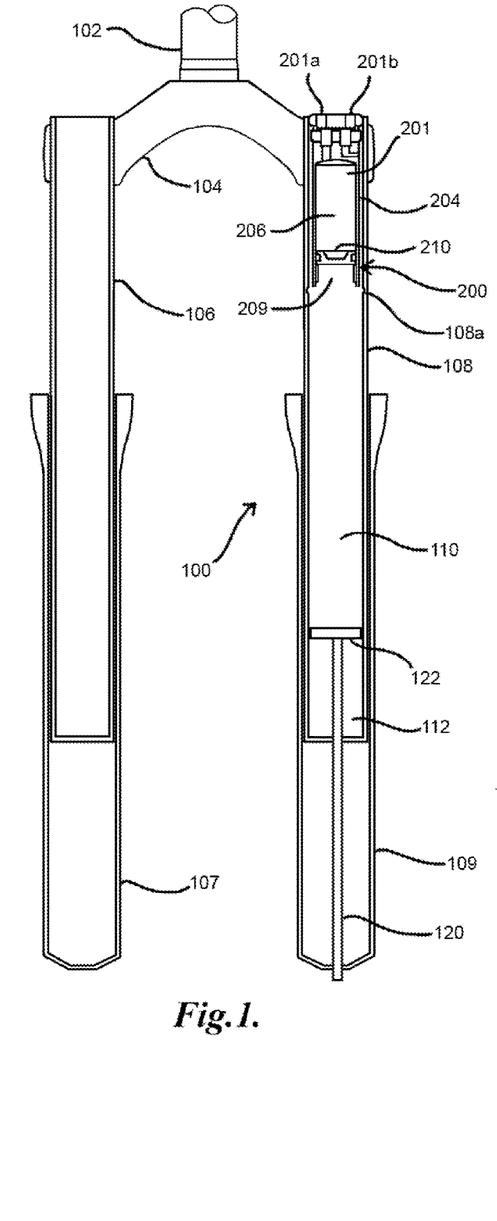
FIG. 1 illustrates a cross-section of an example of a suspension fork with a positive air spring, a negative spring and an adjustable air chamber in some embodiments of the present invention.

In one aspect of the invention, as illustrated in FIG. 1, a vehicle suspension device may generally include a fork having at least a central steering tube, coupled to a crown which branches into two fork legs. FIG. 1 shows an example of a suspension fork 100 which may include a steerer tube 102 connected to a crown 104, from which stanchions 106 and 108 extend. In general, the two fork legs may be compressible in length with a given amount of travel. Each fork leg may generally have a lower tubular portion, such as lowers 107 and 109 in FIG. 1, with an upper tubular stanchion disposed at least partially therein, such as stanchions 106 and 109, respectively. The stanchion may generally have a stop or limiter such that it does not completely exit the lower tubular portion during operation. In some embodiments, at least one fork leg may generally house a pressurized air chamber with a piston disposed therein, where the piston is able to translate within the air chamber with a fixed end attached to the lower tubular portion. FIG. 1 illustrates stanchion 108 housing a first pressurized air chamber 110, which may also be referred to as a positive air spring, with a piston 120 fixed at the bottom of the lower 108 with a piston head 122 within the first pressurized air chamber 110. The piston head 122 may generally include a seal, gasket and/or other appropriate feature to maintain a pressure-tight seal between the piston head 122 and the wall of the first pressurized air chamber 110.

In some embodiments, the pressurized air chamber may generally occupy the space between the top of the stanchion, which may attach to the crown, and the head of the piston, as illustrated with first pressurized air chamber 110 in FIG. 1 sitting between the end of the stanchion 108 attached to the crown 104 and the piston head 122. When subjected to a vertical load, the piston 120 may generally push on the gas in the air chamber 110 and cause it to compress, initiating travel of the stanchion 108 into the lower tubular portion 109. The air chamber 110 and piston 120 may thus be utilized as a positive air spring.

In exemplary embodiments, an example of which is illustrated in FIG. 1, there may also be a second air chamber 112 which may generally occupy the space between the piston head 122 and the bottom of the stanchion 109. The second air chamber 112 may also be referred to and may generally operate as a negative air spring 112, and may applying pressure to the opposite side of the piston head 122 as the positive air spring 110. The positive and negative air springs 110, 112 may be independently pressurized with gas, or they may be fully linked, partially linked, or selectively linked to allow gas to flow between them. In alternative embodiments, the negative air spring may also be replaced with a coil spring and/or any other appropriate spring (not shown).

In an exemplary aspect, the fork may include features for decreasing the initial volume of the air chamber of the positive air spring during the initial part of travel and may further include features for expanding the air chamber of positive air spring during a later part of travel. This decreasing of initial volume may be desirable, for example, as the smaller initial volume of the positive air spring may generally cause the spring rate to be more progressive than a larger volume air spring and may thus enable the user to operate the positive air spring with lower pressure to increase initial suppleness. The expanding of the positive air spring later in the travel may be desirable, for example, to reduce spiking, such as towards the bottom of the fork travel.

Figure 2:
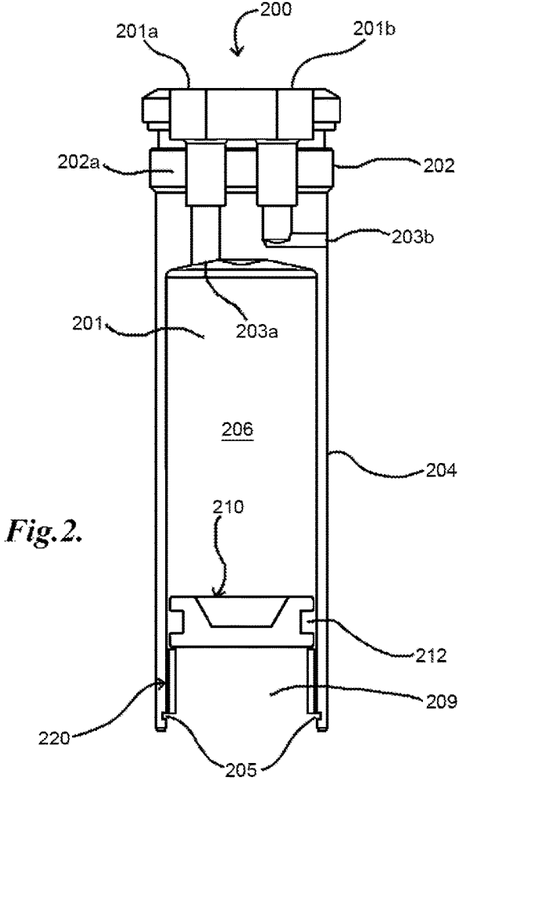
FIG. 2 illustrates a cross-section of an example of an adjustable air chamber unit in some embodiments of the present invention.

In an exemplary embodiment, as shown in FIG. 1, the fork 100 includes an adjustable air chamber unit 200 in addition to the positive and negative air springs 110, 112. The adjustable air chamber unit 200 may generally occupy a space at the top of the stanchion 108 (at the crown 104) and above the positive air spring 110. The adjustable air chamber unit 200 may generally include a tubular portion 204 with one end 201 connected to a valve 201a to pressurize the chamber 206, and the other end 209 being open to the positive air spring 110 below. The tubular portion 204 may generally be constructed to hold pressurized gas and may generally be constructed of metal or another material of appropriate strength to contain a pressurized gas. The adjustable air chamber unit 200 further includes a floating piston 210 within the tubular portion 204 which may generally translate vertically within the tubular portion 204 between the two ends 201, 209. The floating piston may generally include a piston head without a piston arm, as illustrated in FIGS. 1 and 2, and may also include a seal or gasket, such as seal 212, to seal and separate the space 206 from the positive air spring 110. The tubular portion 204 may generally include a retaining stop for retaining the floating piston 210 within the tubular portion 204 and thus preventing the floating piston 210 from translating out through the lower end 209 of the tubular portion 204 into, for example, the positive air spring 110. The adjustable air chamber unit 200 may thus be utilized by pressurizing the space 206 between the valve end 201 and the floating piston 210 with gas such that the floating piston 210 translates downward to restrict the volume of the positive air spring 110. During use, load on the fork 100 may then load both the positive air spring 110 and the adjustable air chamber 200, with the adjustable air chamber 200 decreasing in volume during at least part of the travel due to the increased pressure in the positive air spring 110 pushing on the floating piston 210.

In some embodiments, as illustrated in FIG. 2, the adjustable air chamber unit 200 may also include at least one spacer 220 between the floating piston 210 and the retaining stop of the tubular portion 204, which may be, for example, a clip which may seat in a groove 205, such that the maximum volume of the adjustable air chamber space 206 between the floating piston 210 and the valve end 201 may be adjusted. This may generally be desirable to tune the characteristics of the adjustable air chamber 200 and its interaction with the positive air spring 110.

In some exemplary embodiments, the adjustable air chamber may be included into a separate unit which may, for example, be inserted into an existing fork leg as a retrofit, as illustrated with the unit 200 in FIG. 2. This may be desirable as there are many existing fork designs which can vary greatly in performance and characteristics, and many users may desire to retain most, if not all, of those while also utilizing the characteristics and performance enhancements of the adjustable air chamber unit. For example, an adjustable air chamber unit 200 may be utilized which may thread into the top of a fork stanchion similarly to the air valve cap of many existing forks, such as by utilizing a threaded portion 202a of the capping portion 202, as shown in FIG. 2.

In some embodiments, the adjustable air chamber unit 200 may also include multiple valves to, for example, allow separate pressurization of the positive air spring, the negative air spring and/or the adjustable air chamber. FIGS. 1 and 2 illustrate an example of a cap 202 with valves 201a and 201b, where valve 201a pressurizes the space 206 through opening 203a, and valve 201b pressurizes the positive air spring 110 through opening 203b which connects to the outside of tubular portion 204, where there may be a sufficient gap or space between the outside of tubular portion 204 and the wall of stanchion 108 to allow gas to flow into the positive air spring 110. The adjustable air chamber unit 200 may further be utilized, for example, with a c-clip and/or other appropriate retention feature inside the stanchion to hold the unit in place, which may be positioned in a groove or other feature 108a (if not integral), as illustrated in FIG. 1.

Figure 3:
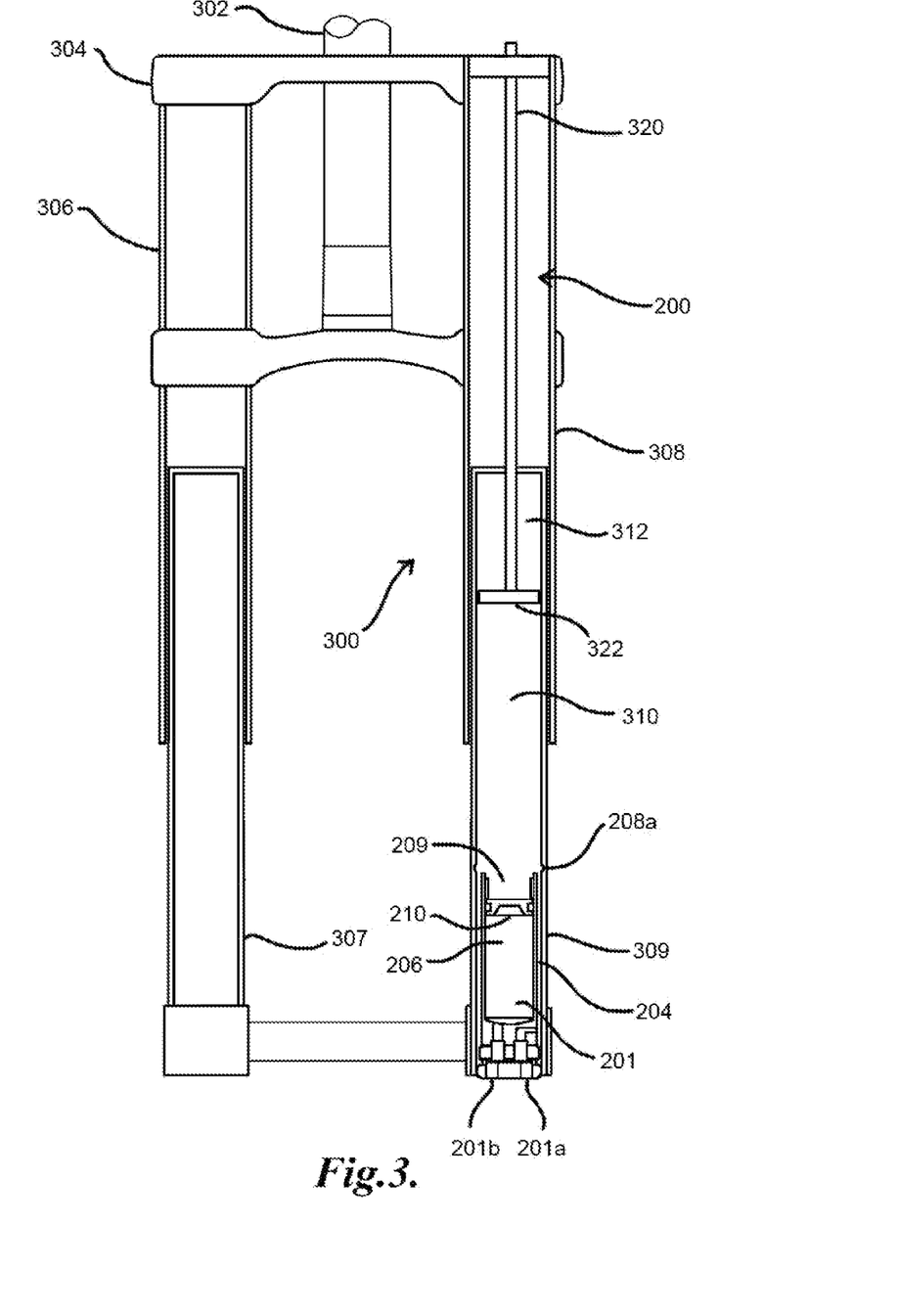
FIG. 3 illustrates a cross-section of an example of an inverted suspension fork with a positive air spring, a negative spring and an adjustable air chamber in some embodiments of the present invention.

In another aspect of the invention, as illustrated in FIG. 3, a vehicle suspension device may generally include an inverted fork having at least a central steering tube, coupled to a crown which branches into two fork legs. FIG. 3 shows an example of a suspension fork 300 which may include a steerer tube 302 connected to an upper crown 304, from which fork uppers 306 and 308 extend. In general, the two fork legs may be compressible in length with a given amount of travel. Each fork leg may generally have a lower tubular portion, such as stanchions 307 and 309 in FIG. 3, which are disposed at least partially inside the fork uppers 306 and 308, respectively. The stanchion may generally have a stop or limiter such that it does not completely exit the upper tubular portion during operation. In some embodiments, at least one fork leg may generally house a pressurized air chamber with a piston disposed therein, where the piston is able to translate within the air chamber with a fixed end attached to the upper tubular portion. FIG. 3 illustrates stanchion 309 housing a first pressurized air chamber 310, which may also be referred to as a positive air spring, with a piston 320 fixed at the top of the upper 308 with a piston head 322 within the first pressurized air chamber 310. The piston head 322 may generally include a seal, gasket and/or other appropriate feature to maintain a pressure-tight seal between the piston head 322 and the wall of the first pressurized air chamber 310.

In some embodiments, the pressurized air chamber may generally occupy the space between the bottom of the stanchion, and the head of the piston, which may attach to the crown, as illustrated with first pressurized air chamber 310 in FIG. 3 sitting between the end of the stanchion 308 attached to the crown 304 and the piston head 322. When subjected to a vertical load, the piston 320 may generally push on the gas in the air chamber 310 and cause it to compress, initiating travel of the stanchion 309 into the upper tubular portion 308. The air chamber 310 and piston 320 may thus be utilized as a positive air spring.

In exemplary embodiments, an example of which is illustrated in FIG. 3, there may also be a second air chamber 312 which may generally occupy the space between the piston head 322 and the top of the stanchion 309. The second air chamber 312 may also be referred to and may generally operate as a negative air spring 312, and may applying pressure to the opposite side of the piston head 322 as the positive air spring 310. The positive and negative air springs 310, 312 may be independently pressurized with gas, or they may be fully linked, partially linked, or selectively linked to allow gas to flow between them. In alternative embodiments, the negative air spring may also be replaced with a coil spring and/or any other appropriate spring (not shown).

In other embodiments, a one-leg fork design may also be utilized, such as the Lefty®-type forks (Cannondale Bicycle, Bethel, Conn., U.S.A.). In general, the operation of an adjustable air chamber in a one-leg fork design may be substantially similar to the operation in a two-leg fork design.

In another aspect of the invention, a rear shock absorber may also include features for decreasing the initial volume of the air chamber of the positive air spring during the initial part of travel and may further include features for expanding the air chamber of positive air spring during a later part of travel, similarly to the fork, as above.

Figure 4:
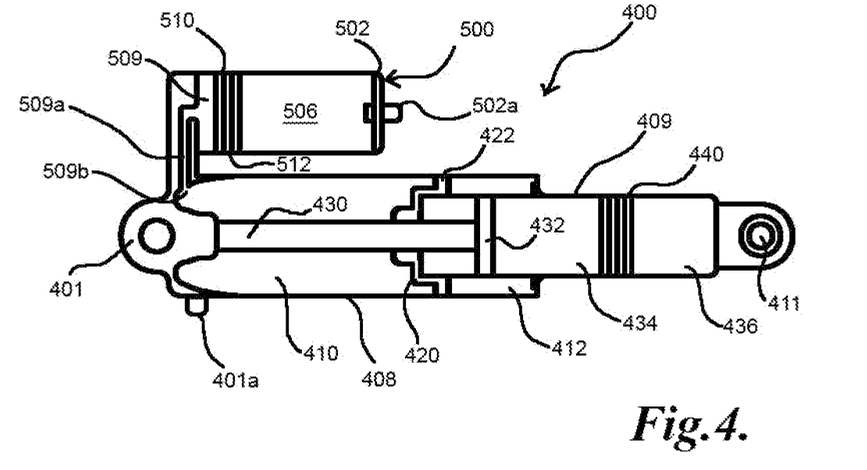
FIG. 4 illustrates a cross-section of a rear shock absorber with a positive air spring, a negative spring and an adjustable air chamber in an extension body in some embodiments of the present invention.

FIG. 4 illustrates an example of a rear shock 400 which may include an adjustable air chamber in an extension unit 500. The rear shock 400 may generally include mounting ends 401 and 411 for connecting to frame and/or suspension components (not shown), a main tubular body 408, and a tubular piston body 409 translatably inserted into body 408. The piston body 409 may generally be capped with a piston head 420, which may further include a seal 422 to seal gas in the air chamber 410, which may generally be referred to as a positive air spring. A further air chamber may serve as a negative air spring 412 on the opposing end of piston head 420 as positive air spring 410. A coil (not shown) may also be utilized as a negative spring in place of negative air spring 412. The piston body 409 may also generally house a dampener for controlling the rate of compression and/or rebound of the rear shock 400, and may generally include a dampener piston 430 with piston head 432 in dampener fluid chamber 434. The dampener fluid chamber 434 may, for example, be at least partially filled with a hydraulic and/or other dampener fluid, which, when applied with pressure during the travel of the rear shock 400 by action of the dampener piston 430, may push against a floating piston 440 in the piston body 409. The floating piston 440 may further push on a gas in charge chamber 436, such as, for example, a nitrogen charge. As above, a valve, such as valve 401*a* as illustrated, may be used to independently pressurize the positive air spring 410 and/or the negative air spring 412.

In an exemplary embodiment, a rear shock 400 may include an adjustable air chamber similar to the fork 100, as above. In other exemplary embodiments, the rear shock may include an adjustable air chamber which may, for example, sit outside of the positive air spring 410, such as in an extension part or piggyback portion 500, as illustrated in FIG. 4. The adjustable air chamber unit 500 may operate generally similarly to the adjustable air chamber 200 in the fork 100, as above, and may generally include a floating piston 510, which may include a seal or gasket 512, with one end 509 of chamber on one side of the floating piston 510 being in fluid communication with the positive air spring 410, such as through a duct 509*a* and opening 509*b* as shown, such that pressure in the opposing end 506 of the adjustable air chamber may load one side of the floating piston 510 and the positive air spring 410 may load the other side of the floating piston 510. The space 506 may generally be pressurized through a valve, such as valve 502*a* at end 502 of the extension 500. At least one spacer may also be included to limit the translation of the floating piston 510, similarly to the spacers discussed above.

Figure 5:
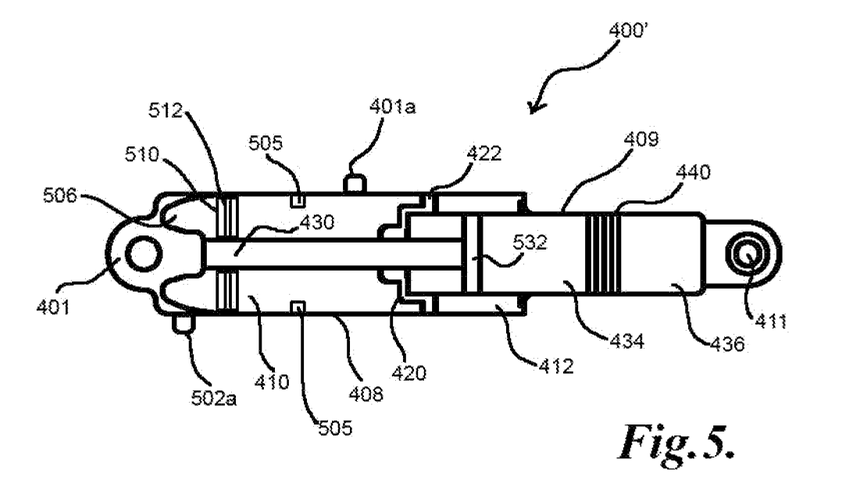
FIG. 5 illustrates a cross-section of a rear shock absorber with a positive air spring, a negative spring and an adjustable air chamber in some embodiments of the present invention.

FIG. 5 illustrates an example of a rear shock 400'. The rear shock 400' may generally include mounting ends 401 and 411 for connecting to frame and/or suspension components (not shown), a main tubular body 408, and a tubular piston body 409 translatably inserted into body 408. The piston body 409 may generally be capped with a piston head 420, which may further include a seal 422 to seal gas in the air chamber 410, which may generally be referred to as a positive air spring. A further air chamber may serve as a negative air spring 412 on the opposing end of piston head 420 as positive air spring 410. A coil (not shown) may also be utilized as a negative spring in place of negative air spring 412. The piston body 409 may also generally house a dampener for controlling the rate of compression and/or rebound of the rear shock 400', and may generally include a dampener piston 430 with piston head 432 in dampener fluid chamber 434. The dampener fluid chamber 434 may, for example, be at least partially filled with a hydraulic and/or other dampener fluid, which, when applied with pressure during the travel of the rear shock 400' by action of the dampener piston 430, may push against a floating piston 440 in the piston body 409. The floating piston 440 may further push on a gas in charge chamber 436, such as, for example, a nitrogen charge. As above, a valve, such as valve 401*a* as illustrated, may be used to independently pressurize the positive air spring 410 and/or the negative air spring 412. The rear shock 400' may further include an adjustable air chamber 506, which may be within the body 408, as illustrated in FIG. 5, and may operate generally similarly to the adjustable air chamber 506 in the rear shock 400 or the adjustable air chamber 200 in the fork 100, as above, and may generally include a floating piston 510, which may include a seal or gasket 512, such that pressure in the opposing end 506 of the adjustable air chamber may load one side of the floating piston 510 and the positive air spring 410 may load the other side of the floating piston 510. The space 506 may generally be pressurized through a valve, such as valve 502a. A retaining feature may also be included to limit the translation of the floating piston 510 within the body 408, as shown with the retaining stop 505 in FIG. 5. This may be desirable, for example, to limit the size of the adjustable air chamber 506. The retaining feature may further generally be between the valves 401a and 502a as to separate them, such that, for example, the floating piston 510 may not translate within the body 408 to an extent that both valves 401a and 502a can pressurize the same space. At least one spacer may also be included to limit the translation of the floating piston 510, similarly to the spacers discussed above.

In an alternative aspect of the invention, other forms of springs may be utilized in place of an adjustable air chamber for decreasing the initial volume of the air chamber of the positive air spring during the initial part of travel and for expanding the air chamber of positive air spring during a later part of travel. In some alternative embodiments, a coil spring, elastomeric spring, and/or any other appropriate form of spring may be utilized in place of the gas in the adjustable air chamber. In some embodiments, the alternative spring may also be adjustable such as, for example, by preloading for altering the initial spring characteristics. For example, a preloading adjuster may be included and may generally apply a preload or initial additional compression on the spring to alter the initial spring response to load from the positive air spring.

Example of Spring Rates of an Air Spring Fork

Figure 6:
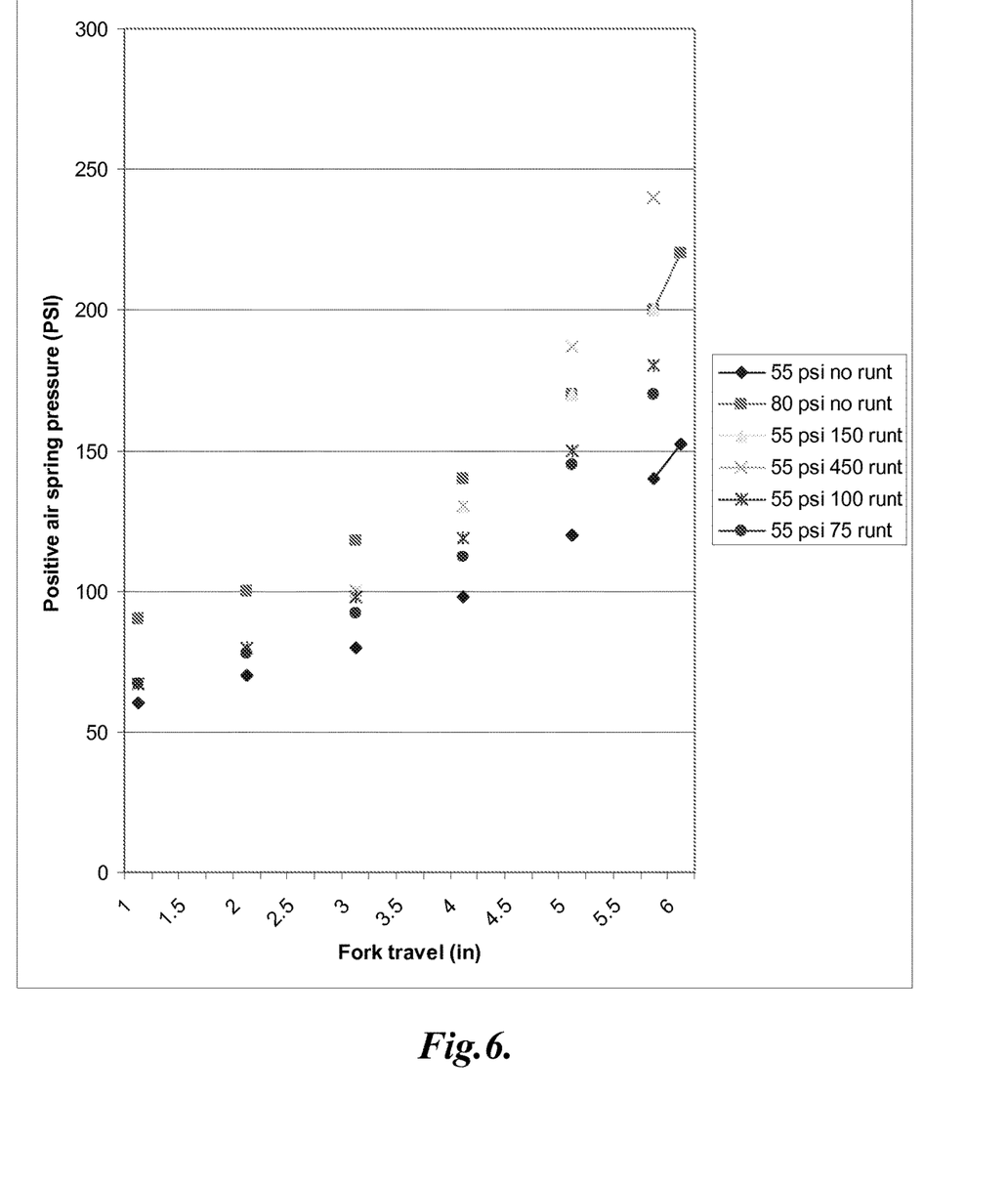
FIG. 6 illustrates examples of positive spring rates with a suspension fork at different pressures and with or without inclusion of an adjustable air chamber at different pressures.

FIG. 6 illustrates the spring rates of a fork utilizing no adjustable air chamber with a positive air spring at 55 and 80 PSI, and the same fork utilizing an adjustable air chamber, with the positive air spring at 55 PSI and the adjustable air chamber at 75, 100, 150 and 450 PSI. The fork utilized was a Rockshox® Lyrik. As the spring rates show, the adjustable air chamber allows a blending of the spring rates of the normal fork at 55 and 80 PSI without the initial stiffness of the 80 PSI fork and without the lack of bottom-out resistance of the 55 PSI fork.

It will be appreciated by those of ordinary skill in the art that the present invention can be embodied in other specific forms without departing from the spirit or essential character hereof. The present description is therefore considered in all respects to be illustrative and not restrictive. The scope of the present invention is indicated by the appended claims, and all changes that come within the meaning and range of equivalents thereof are intended to be embraced therein.

The invention claimed is:

1. A suspension fork comprising:
   a steerer tube;
   a crown attached to said steerer tube;
   a pair of fork legs extending from said crown, each of said fork legs comprising a hollow tubular stanchion translatably inserted into an open end of a hollow tubular lower having a closed end, at least one of said fork legs housing a positive air spring chamber and a piston disposed within said positive air spring chamber adapted;
   an adjustable air chamber extending from said crown and open into said hollow tubular stanchion, said adjustable air chamber comprising a tubular housing, a floating piston disposed therein and a valve in fluid communication with the interior of said tubular housing;
   wherein said valve is adapted to pressurize said tubular housing between said crown and said floating piston independently from said positive air spring chamber.

2. The suspension fork of claim 1, further comprising a retaining stop in said adjustable air chamber adapted for retaining said floating piston within said adjustable air chamber.

3. The suspension fork of claim 1, further comprising a retaining stop in said adjustable air chamber adapted for retaining said floating piston within said adjustable air chamber, and at least one spacer between said floating piston and said retaining stop.

4. The suspension fork of claim 1, wherein said adjustable air chamber is a removable unit from said suspension fork.

5. The suspension fork of claim 1, further comprising a negative air spring chamber separated from said positive air spring chamber by said piston.

6. The suspension fork of claim 1, further comprising a second valve adapted to pressurize said positive air spring chamber.

7. The suspension fork of claim 6, wherein said second valve is disposed proximally to said crown.

8. A suspension shock absorber comprising:
   a tubular body having a hollow interior and a valve, said valve being adapted to pressurize said hollow interior of said tubular body;
   a tubular piston body with a piston head inserted into said tubular body, said piston head separating said hollow interior of said tubular body into a positive and a negative air spring chamber;
   an extension body having a valve and hollow interior;
   a floating piston disposed within and dividing said hollow interior of said extension body into a first and second chamber;
   wherein said valve of said extension body is adapted to pressurize said second chamber and said first chamber is in fluid communication with said positive air spring chamber.

9. The suspension shock absorber of claim 8, further comprising suspension mounting interfaces.

10. The suspension shock absorber of claim 9, wherein said suspension mounting interfaces are adapted for mounting said suspension shock absorber to the rear suspension of a bicycle.

11. The suspension shock absorber of claim 8, further comprising a fluid dampener.

12. The suspension shock absorber of claim 8, further comprising a first suspension mounting interface connected to said tubular body and a second suspension mounting interface connected to said tubular piston body.

13. The suspension shock absorber of claim 8, further comprising at least one spacer adapted to limit translation of said floating piston.

14. An adjustable air spring assembly comprising:
   a tubular housing having a hollow interior, a first end and a second end, said first end comprising a first valve, a second valve and an adapter for inserting into and attaching to an end of a suspension fork stanchion and said second end being open;
   a floating piston disposed and retained in said tubular housing, said floating piston dividing said hollow interior into a chamber at said first end and a chamber at said second end;

wherein said first valve is in fluid communication with said chamber at said first end and said second valve is in fluid communication with the exterior of said tubular housing.

15. The adjustable air spring assembly of claim 14, further comprising a retaining stop proximal to said second end adapted for retaining said floating piston within said hollow interior.

16. The adjustable air spring assembly of claim 15, further comprising at least one spacer between said floating piston and said retaining stop.

17. The adjustable air spring assembly of claim 14, wherein said adapter comprises a threaded interface.

18. The adjustable air spring assembly of claim 14, wherein said floating piston is adapted to form an air-tight seal between said chamber at said first end and said chamber at said second end.

19. The adjustable air spring assembly of claim 14, wherein said floating piston is adapted to translate within said hollow interior while maintaining said air-tight seal between said chamber at said first end and said chamber at said second end.

20. The adjustable air spring assembly of claim 14, wherein said threaded interface is adapted to thread into and seal an interface with a crown of a suspension fork.

* * * * *